Dec. 10, 1940.  W. A. SERIGHT  2,224,800
CULTIVATOR ATTACHMENT
Filed July 12, 1937  2 Sheets-Sheet 1
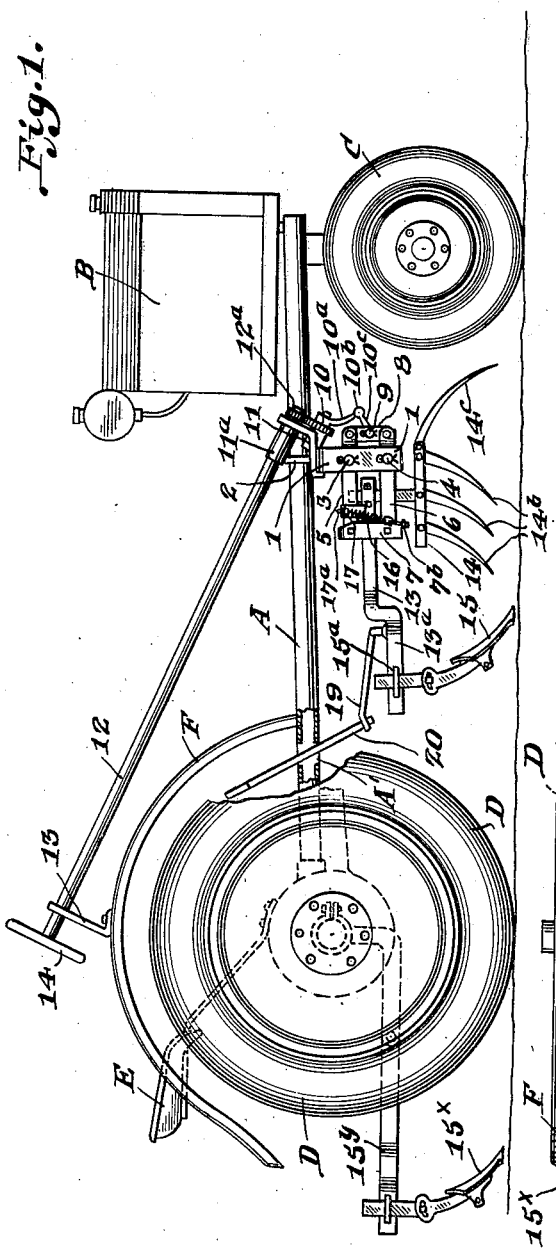
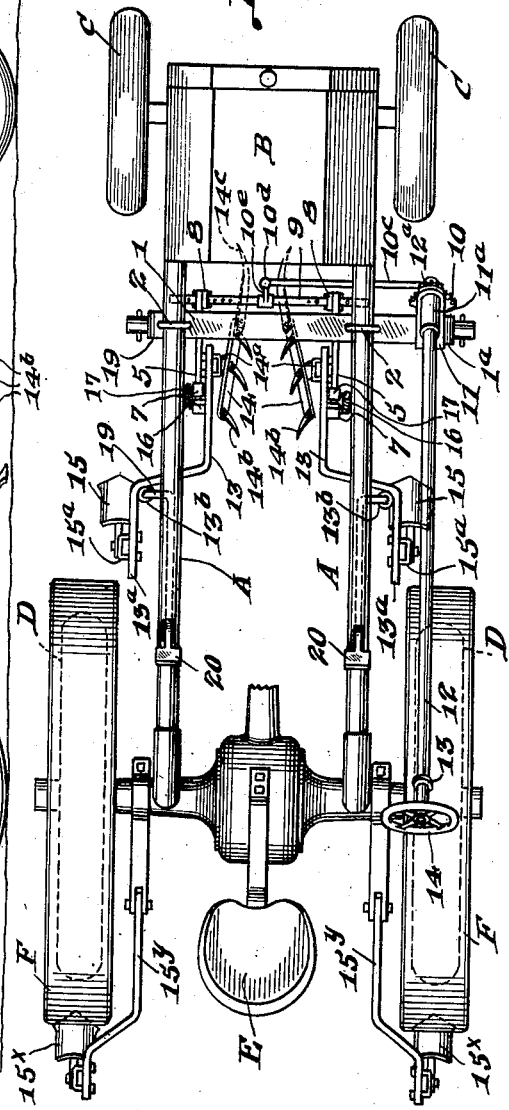
INVENTOR:
Warren A. Seright

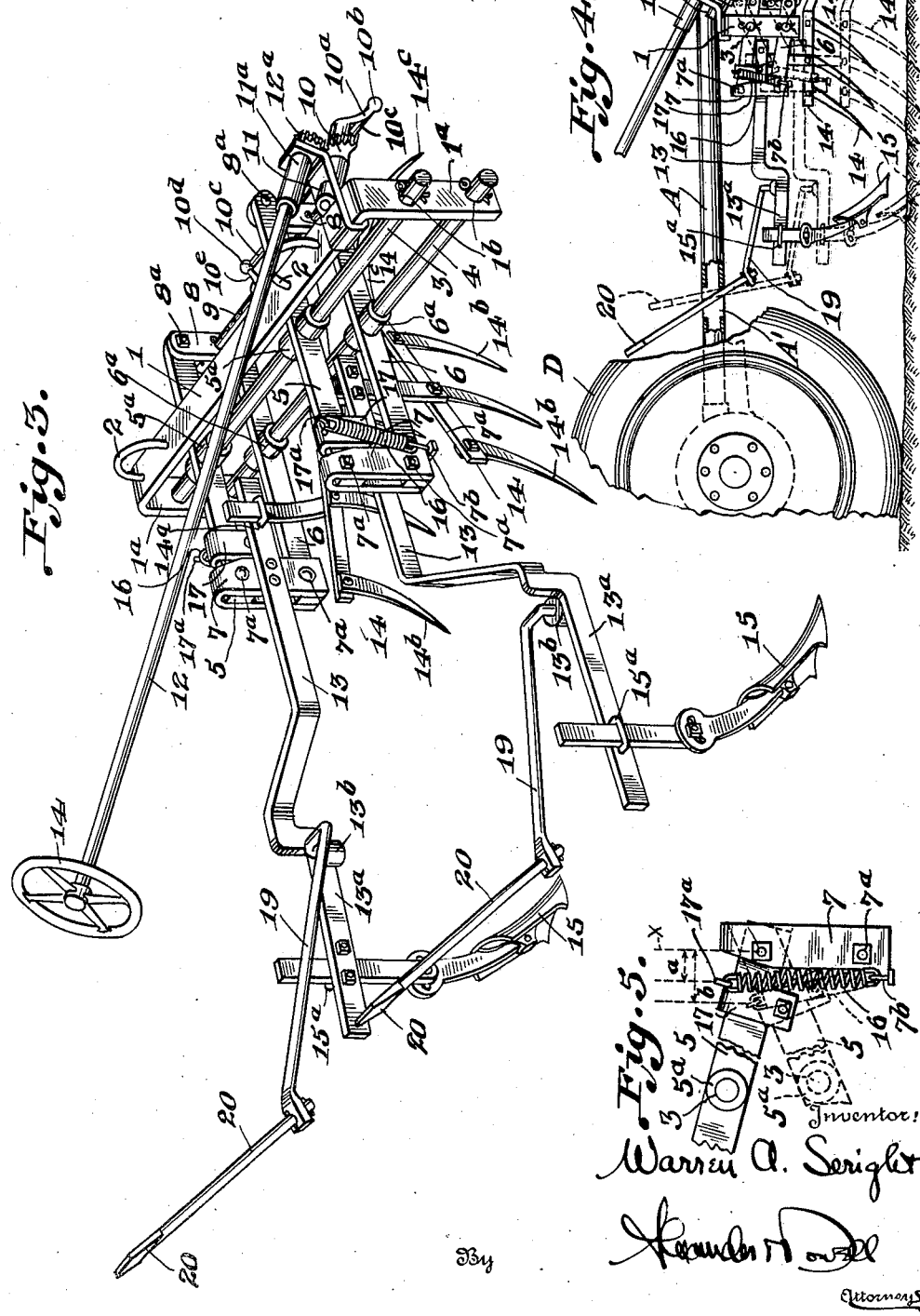

Patented Dec. 10, 1940

2,224,800

UNITED STATES PATENT OFFICE 2,224,800

CULTIVATOR ATTACHMENT

Warren A. Seright, Muscatine, Iowa

Application July 12, 1937, Serial No. 153,225

10 Claims. (Cl. 97—47)

This invention is a novel cultivator attachment, and the principal object thereof is to provide an attachment which may be readily mounted upon motor tractors, or upon ordinary horse-drawn cultivator frames, said attachment embodying members carrying ground working tools adapted to be raised and lowered by mechanism permitting a maximum of movement in a limited amount of headroom, said mechanism maintaining the members constantly substantially parallel to the ground surface in order that all the ground working tools carried by the members will be raised and lowered the same amount.

Other objects of the invention are to provide means operable from the operator's seat for simultaneously shifting the members laterally of the tractor or cultivator frame to adjust the members with respect to the axis of the row of vines or plants being cultivated; to provide means for varying the spacing between the members; to provide adjustable means for counterbalancing the members so that a substantially constant lifting force is exerted on the members in all positions thereof; to provide means for maintaining the members in lowered position; also to provide said members with rake attachments at their forward ends for lifting the runners of the vines or plants and for cultivating close to the roots thereof, said members carrying at their rear ends cultivator shovels staggered with respect to the rake attachments. The rake attachment however is an individual element that can be replaced with an ordinary cultivator shovel if desired.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:

Fig. 1 is a side elevation of a conventional motor tractor showing my novel cultivator attachment applied thereto with the ground working implements raised above the ground surface.

Fig. 2 is a top plan view of the assembly shown in Fig. 1.

Fig. 3 is an enlarged perspective view of my cultivator attachment detached.

Fig. 4 is a side elevation of the attachment and adjacent parts of the tractor illustrating the vertical movement of the ground tool carrying members, the same being shown in raised inoperative position in full lines, and in lowered or ground engaging position in dotted lines.

Fig. 5 is an enlarged diagrammatic view illustrating the positions assumed by the counterbalancing spring.

The attachment is illustrated in connection with a motor tractor of conventional type consisting of a tractor frame including side bars A which preferably comprises pipe sections suitably connected together and carrying upon their front ends the motor B below which are disposed the usual steering wheels C pivoted by suitable mechanism (not shown). At the rear ends of the side bars are the drive wheels D driven from motor B, and over wheels D are disposed fenders F. An operator's seat E is also provided at said end. The details of the tractor form no part of my present invention.

My novel attachment is mounted below side bars A and between wheels C—D, and preferably comprises a cross member 1 fixedly secured to side bars A by U-bolts 2 or the like, and having its ends flanged downwardly as at 1a beyond the sides of the tractor frame provided with spaced vertically aligned bearings 1b for parallel horizontal shafts 3 and 4 carrying adjacent their ends sets of parallel links 5—6 having bearings 5a—6a (Fig. 3) respectively disposed one above the other journaled upon the shafts.

Adjacent the rear end of each set is a U-shaped plate 7 embracing the links 5—6, pivot bolts 7a transfixing the plate and links whereby the links of each set are maintained in parallel relation and whereby as the links 5 and 6 of each set are swung up and down the related plate will move up and down while maintaining its axis substantially vertical throughout such movement.

The front ends of the links 5 and 6 of each set are connected together by straps 8 pivoted thereto as at 8a, and a rod 9 transfixes straps 8, said rod having series of spaced perforations therein to receive cotter pins or the like engaging the opposite faces of the straps to permit adjustment of the spacing between the sets of links 5—6 to suit the spacing of the rows of vines or plants being cultivated.

Means are provided for simultaneously shifting the spaced sets of links 5—6 on shafts 3 and 4 to align the sets with respect to the rows of vines or plants, the shifting means shown comprising a segmental gear 10 journaled on a stub shaft in a bearing bracket 11 mounted upon one end of the cross-member 1, which bracket is also provided with a bearing 11a for a shaft 12 carrying a pinion 12a at its lower end meshing with the segmental gear. Segmental gear 10 carries an arm 10a having a ball and socket connection 10b with a link 10c whose opposite end has a ball and socket connection 10d (Fig. 3) with a fixed lug 10e on rod 9 whereby as shaft 12 is rotated rod 9 will be shifted laterally with respect to the axis of the tractor. The upper end of shaft 12 is journaled in a bracket 13 secured upon the adjacent fender F and carries a hand wheel 14 or the like within convenient reach from operator's seat E. The upper end of shaft 12 however may be supported in any other desired manner.

Non-rotatably secured to the inner face of each plate 7 is a horizontal frame member 13 carrying at its front end a clamp 14a for the shank of a harrowing tool 14 such as disclosed in my U. S. Letters Patent No. 2,075,475 issued March 30, 1937, each said tool 14 having one or more staggered teeth 14b (Fig. 2) adapted to cultivate the ground close to the roots of the row of vines or plants, the leading ends of the opposed tools 14 converging, as shown in Fig. 2, in order to stagger the teeth 14b, and the leading ends carrying fingers 14c adapted to raise or shift the runners of the vines or plants inwardly towards the axis of the row in advance of the teeth 14b. The harrow attachment and its operation, being fully described in my aforesaid patent, needs no detailed description herein. In place of the harrow attachments 14 however, ordinary cultivator shovels, or any other desired ground working tools, may be substituted.

Frames 13, adjacent their rear ends, are provided with outwardly offset portions 13a carrying clamps 15a for the shanks of cultivator shovels 15 of any desired type for cultivating the ground between rows, the axes of the shovels being staggered with respect to the axes of the harrow attachments 14 as indicated. If desired, additional shovels may be mounted directly on the tractor frame as shown at 15x in Figs. 1 and 2, the additional shovels being provided with separate frames 15y connected directly to the tractor frame in any desired manner, and being raised and lowered by any suitable means (not shown).

Counterbalancing means are provided for the frames 13, said means being indicated more particularly in Fig. 5 and comprising a hook 7b mounted at the lower forward corner of each plate 7,7, said hook being engaged by the lower end of a spring 16 the upper end of which engages a hook 17a on an adjustable member 17 mounted upon the upper link 5 of each set. Clamp 17 may be adjusted forwardly or rearwardly upon the link 5 in order to increase or lessen the leverage action of the spring 16, so that by proper adjustment of the clamp 17 the frame 13 can be raised or lowered with the greatest of ease by the operator. When the frame 13 is in lowered position the link 5 assumes the position shown in full lines in Fig. 5 and the hook 17a is disposed a distance denoted by the line a from the vertical axis x of pivot bolt 7a of link 5 in the plate 7. When frame 13 is in raised position the link 5 assumes the position shown in dotted lines in Fig. 5, but the hook 17a will be shifted from the vertical axis x of the bolt 7a a distance denoted by the line b in Fig. 5, while the spring 16 has decreased in length. Thus the decreased tension of the spring when the frame is in raised position is substantially offset by the increased leverage occasioned by the shifting of the hook 17a for as each frame 13 is lowered the top of its related spring 16 moves rearwardly decreasing the leverage by the difference between the lines b and a of Fig. 5,
while the spring lengthens, thereby rendering the spring lifting action on the frame nearly constant for any position, so that when the operator releases the pressure on the foot pedals 20 (hereinafter described) each spring 16 will automatically raise its related frame 13 and disengage the ground working elements 14 and 15. I thus provide an individual yieldable lift for each frame 13, also a lift which is adjustable since each clamp 17 may be shifted on bar 5 to increase or decrease the tension of the spring.

The means for raising and lowering the frame 13 comprise a swivel socket 13b on each frame 13 adjacent the rear end receiving a head on one end of a lever 19, the swivel connection permitting the frames 13 to be shifted laterally of the tractor frame. The other end of each lever 19 has a swivel and pivotal connection with the lower end of a foot pedal 20 conveniently passing through a slot A' in the side bar A of the tractor frame (Fig. 4) within easy reach from the operator's seat E. Spring 16 will cause the related frame 13 to rise into inoperative position shown in full lines in Fig. 4 when the operator releases pressure on the foot pedals 20.

The frames 13 are thus always maintained in a substantially horizontal position, and therefore the front as well as the back end of each frame will be raised above the ground with a very short lift permitting use of the attachment on implements where only a limited amount of head room is available. Also the lateral shifting means enables the operator to constantly maintain the ground engaging elements 14 and 15 in correct alignment with respect to the axis of the row of vines or plants being cultivated.

My cultivator attachment is not limited to use only on the type of tractor shown in the drawings, for obviously same may be used on any other type of tractor, or on any horse drawn equipment such as a sulky or other wheeled cultivator frame.

I claim:

1. A cultivator attachment for wheeled vehicles having side bars, comprising a member adapted to be secured to a bar; a plate; parallel links pivotally connecting the plate with said member for permitting substantially vertical movement of the plate; a substantially horizontal frame carried by the plate; ground engaging tools carried by said frame; means exerting a substantially constant lifting force on the plate for any position of the plate within its working limits; and means for depressing the frame; said exerting means comprising a hook adjustably mounted on one link adjacent the plate; and a substantially vertical contractile spring connecting the hook with the lower end of the plate whereby as the plate is lowered the increase in length of the spring will be offset by a decrease in leverage of the upper end of the spring from the axis of the plate to maintain a substantially constant lifting action on the plate.

2. A cultivator attachment for wheeled vehicles having side bars, comprising a member adapted to be secured to a bar; a plate; parallel links pivotally connecting the plate with said member for permitting substantially vertical movement of the plate; a substantially horizontal frame carried by the plate; ground engaging tools carried by said frame; means exerting a substantially constant lifting force on the plate for any position of the plate within its working limits; and means for depressing the frame; said side bar having a slot; and said frame depressing means comprising a foot pedal connected with the frame adapted to slidably engage the slot.

3. A cultivator attachment for wheeled vehicles having side bars, comprising a member adapted to be secured to a bar; a plate; parallel links pivotally connecting the plate with said member for permitting substantially vertical movement of the plate; a substantially horizontal frame carried by the plate; ground engaging tools carried by said frame; means exerting a substantially constant lifting force on the plate for any position of the plate within its working limits; and means for depressing the frame; said ground engaging tools comprising a harrow implement at the front end of the frame having staggered teeth and having vine raising means in advance of the teeth; and a cultivator shovel at the rear end of the frame staggered with respect to the harrow implement.

4. A cultivator attachment for wheeled vehicles having side bars and a steering mechanism, comprising a cross member adapted to be secured to the side bars; a pair of plates; laterally shiftable parallel links pivotally connecting each plate with said member for permitting substantial vertical movement of the plate; means for adjusting the distance between the plates; substantially horizontal frames carried by the plates; ground engaging tools carried by each frame; means exerting a substantially constant lifting force on each plate for any positions of the plates within their working limits; and means for depressing each frame; transversely disposed parallel shafts mounted in said cross member upon which the links of each plate are mounted; said distance adjusting means comprising strap members connecting the links of each plate; a rod transfixing the strap members; means for adjusting the strap members on the rod; a swingable arm; means independent of the steering mechanism for swinging the arm; and means connecting the arm and rod for simultaneously shifting the plates laterally with respect to the axis of the vehicle.

5. A cultivator attachment for wheeled vehicles having side bars and a steering mechanism, comprising a cross member adapted to be secured to the side bars; a pair of plates; laterally shiftable parallel links pivotally connecting each plate with said member for permitting substantial vertical movement of the plate; means for adjusting the distance between the plates; substantially horizontal frames carried by the plates; ground engaging tools carried by each frame; means exerting a substantially constant lifting force on each plate for any positions of the plates within their working limits; and means for depressing each frame; said exerting means comprising hooks adjustably mounted on one link of each plate; substantially vertical contractile springs connecting the hooks with the lower ends of their respective plates whereby as each plate is lowered the increase in length of its related spring will be offset by a decrease in leverage of the upper end of the said spring from the axis of the plate to maintain a substantially constant lifting action on the plate.

6. A cultivator attachment for wheeled vehicles having side bars and a steering mechanism, comprising a cross member adapted to be secured to the side bars; a pair of plates; laterally shiftable parallel links pivotally connecting each plate with said member for permitting substantial vertical movement of the plate; means for adjusting the distance between the plates; substantially horizontal frames carried by the plates; ground engaging tools carried by each frame; means exerting a substantially constant lifting force on each plate for any positions of the plates within their working limits; and means for depressing each frame; said side bars each having slots; and said frame depressing means comprising foot pedals connected with the respective frames adapted to slidably engage the slots.

7. A cultivator attachment for wheeled vehicles having side bars and a steering mechanism, comprising a cross member adapted to be secured to the side bars; a pair of plates; laterally shiftable parallel links pivotally connecting each plate with said member for permitting substantial vertical movement of the plate; means for adjusting the distance between the plates; substantially horizontal frames carried by the plates; ground engaging tools carried by each frame; means exerting a substantially constant lifting force on each plate for any positions of the plates within their working limits; and means for depressing each frame; said frame having offset portions; and said ground engaging tools comprising a harrow implement at the front end of each frame having staggered teeth, and having vine raising means in advance of the teeth; and cultivator shovels at the rear ends of the frames staggered with respect to the harrow implements.

8. In combination, a wheeled vehicle having side bars and a steering mechanism, a cross member secured to the side bars; a pair of plates; parallel links pivotally connecting each plate with said member for permitting substantially vertical movement of the plates; means for adjusting the distance between the plates; substantially horizontal frames carried by the plates; ground engaging tools carried by each frame; means exerting a substantially constant lifting force on each plate for any positions of the plates within their working limits; means for depressing each frame; and means independent of the steering mechanism for simultaneously shifting the plates laterally with respect to the axis of the vehicle; said exerting means comprising hooks adjustably mounted on one link of each plate; substantially vertical contractile springs connecting the hooks with the lower ends of their related plates whereby as each plate is lowered the increase in length of its related spring will be offset by a decrease in leverage of the upper end of said spring from the axis of the plate to maintain a substantially constant lifting action on the plate.

9. In combination, a wheeled vehicle having side bars and a steering mechanism, a cross member secured to the side bars; a pair of plates; parallel links pivotally connecting each plate with said member for permitting substantially vertical movement of the plates; means for adjusting the distance between the plates; substantially horizontal frames carried by the plates; ground engaging tools carried by each frame; means exerting a substantially constant lifting force on each plate for any positions of the plates within their working limits; means for depressing each frame; and means independent of the steering mechanism for simultaneously shifting the plates laterally with respect to the axis of the vehicle; said frame depressing means comprising a foot pedal connected with the respective frames adapted to slidably engage slots in the side bars.

10. In combination, a wheeled vehicle having side bars and a steering mechanism, a cross member secured to the side bars; a pair of plates; parallel links pivotally connecting each plate with said member for permitting substantially vertical movement of the plates; means for adjusting the distance between the plates; substantially horizontal frames carried by the plates; ground engaging tools carried by each frame; means exerting a substantially constant lifting force on each plate for any positions of the plates within their working limits; means for depressing each frame; and means independent of the steering mechanism for simultaneously shifting the plates laterally with respect to the axis of the vehicle; said frame having offset portions; and said ground engaging tools comprising a harrow implement at the front end of each frame having staggered teeth, and having vine raising means in advance of the teeth; and cultivator shovels at the rear ends of the frames staggered with respect to the harrow implements.

WARREN A. SERIGHT.